(12) United States Patent
Dong et al.

(10) Patent No.: US 8,099,518 B2
(45) Date of Patent: Jan. 17, 2012

(54) METHOD AND SYSTEM FOR PROVIDING ASYNCHRONOUS PORTAL PAGES

(75) Inventors: Bin Dong, Beijing (CN); Xu Guang Gu, Beijing (CN); Tie Li, Beijing (CN); Yue Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 11/563,857

(22) Filed: Nov. 28, 2006

(65) Prior Publication Data
US 2007/0130293 A1    Jun. 7, 2007

(30) Foreign Application Priority Data
Dec. 6, 2005  (CN) .......................... 2005 1 0127894

(51) Int. Cl.
*G06F 15/16* (2006.01)
(52) U.S. Cl. ........................... 709/246; 715/733; 725/63
(58) Field of Classification Search .................... 709/246
See application file for complete search history.

(56) References Cited

U.S. PATENT DOCUMENTS

| | | | |
|---|---|---|---|
| 6,606,544 B2 * | 8/2003 | Glenn et al. ..................... 701/3 |
| 6,738,804 B1 | 5/2004 | Lo | |
| 7,054,593 B2 * | 5/2006 | de La Chapelle et al. ... 455/13.4 |
| 7,085,288 B2 * | 8/2006 | Taylor ........................... 370/468 |
| 7,099,331 B2 * | 8/2006 | Taylor ....................... 370/395.41 |
| 7,136,621 B2 * | 11/2006 | de La Chapelle et al. ... 455/13.2 |
| 7,146,429 B2 * | 12/2006 | Michel ........................... 709/238 |
| 7,222,101 B2 * | 5/2007 | Bishop et al. ..................... 705/51 |
| 7,240,280 B2 * | 7/2007 | Jolley et al. .................... 715/234 |
| 7,346,843 B2 * | 3/2008 | Hind et al. ..................... 715/234 |
| 7,376,900 B2 * | 5/2008 | Guido et al. ................... 715/742 |
| 7,437,125 B2 * | 10/2008 | McLain et al. ............... 455/13.4 |
| 7,450,901 B2 * | 11/2008 | Parkman ....................... 455/12.1 |
| 7,451,400 B2 * | 11/2008 | Bales et al. .................... 715/734 |

(Continued)

FOREIGN PATENT DOCUMENTS
WO    WO 02/23401 A1    3/2002
(Continued)

OTHER PUBLICATIONS

Fred A et al: "The case for portlets", IBM Developerworks, Feb. 1, 2003, pp. 1-7, XP002354928.

(Continued)

*Primary Examiner* — Firmin Backer
*Assistant Examiner* — Hamza Algibhah
(74) *Attorney, Agent, or Firm* — Law Office of Jim Boice (57) ABSTRACT

The present invention provides a method and system for implementing asynchronous portal pages, comprising a portlet monitor resident on a web browser and implemented with a script. When a user interacts with a portlet, the portlet monitor sends a XMLHTTP request to the portal server. The portal server obtains the corresponding web contents from the corresponding portlet based on the request. Then, the web contents are modified and the HTTP requests therein are redirected to XMLHTTP requests. The portlet monitor uses the modified web contents to refresh the web contents of the corresponding portlet in the portal page without reloading the whole portal page. Besides, after the user submits a request for a portlet, during waiting for the portlet being refreshed, the user may continue to interact with other portlets. Thus, the present invention has the abilities of partially refreshing and asynchronous communication.

15 Claims, 5 Drawing Sheets

U.S. PATENT DOCUMENTS

| | | | |
|---|---|---|---|
| 7,500,181 B2* | 3/2009 | Kim et al. | 715/234 |
| 2002/0129241 A1* | 9/2002 | Doyle et al. | 713/157 |
| 2003/0149697 A1* | 8/2003 | Pasquali | 707/10 |
| 2004/0078218 A1* | 4/2004 | Badinelli | 705/2 |
| 2004/0122971 A1* | 6/2004 | Joshi et al. | 709/236 |
| 2004/0205555 A1* | 10/2004 | Hind et al. | 715/513 |
| 2004/0230901 A1* | 11/2004 | Godwin et al. | 715/513 |
| 2004/0243928 A1* | 12/2004 | Hesmer et al. | 715/505 |
| 2005/0021694 A1* | 1/2005 | Yuan | 709/220 |
| 2005/0138104 A1* | 6/2005 | Houh et al. | 709/200 |
| 2005/0261909 A1* | 11/2005 | Sienel et al. | 704/270.1 |
| 2006/0070002 A1* | 3/2006 | Guido et al. | 715/733 |
| 2006/0149746 A1* | 7/2006 | Bansod et al. | 707/10 |
| 2006/0167981 A1* | 7/2006 | Bansod et al. | 709/203 |
| 2006/0282819 A1* | 12/2006 | Graham et al. | 717/113 |
| 2006/0294457 A1* | 12/2006 | Bales et al. | 715/513 |
| 2007/0130500 A1* | 6/2007 | Rivers-Moore et al. | 715/501.1 |

FOREIGN PATENT DOCUMENTS

WO      2005086026 A2      9/2005

OTHER PUBLICATIONS

Ziebold G et al: "Asynchronous Rendering of Portlet Content with AJAX Technology", Internet Citation [Online], Jun. 6, 2005, XP002397762 Retrieved from the Internet: URL:http://developers.sun.com/prodtech/portalserver/reference/techart/asynch_rendering.html> [retrieved on Sep. 5, 2006].

International Business Machines Corporation: "Optimizing and minimizing portlet round trips to a portal server", Research Disclosure, mason Publications, Hampshire, GB, vol. 449, No. 86, Sep. 2001, XP007128940, ISSN: 0374-4353.

* cited by examiner

METHOD AND SYSTEM FOR PROVIDING ASYNCHRONOUS PORTAL PAGES

TECHNICAL FIELD

The present invention relates to portal technology, more particularly, to a method and system for providing asynchronous portal pages.

BACKGROUND OF THE INVENTION

As the Internet becomes more and more pervasive, better technology is constantly being developed for displaying web contents. In this respect portal servers have become a technology of choice in delivering web contents to users. Typically, a portal server is a portal program (e.g. WebSphere Portal Server from International Business Corp. of Armonk, N.Y.) that organizes web contents into a portal page composed of portlets. A user, for instance, can set up his/her own portal page having portlets for news, weather and sports. The portal program would then obtain the desired web contents from appropriate content providers, aggregate the web contents and generate a portal page for end users.

A traditional web application allows a user to fill out a form on a web page, and when the form is submitted, the web browser sends a request to the web server. The web server processes any information sent through the form, and then responds to the web browser with a new web page. In this way, a lot of bandwidth may be wasted since much of the web contents in the first page may also be contained in the second page. Because a request has to be transmitted to the web server on every interaction with the application, the application's response time is dependent on the response time of the web server. This leads to a much slower user interface of a web application than that of a native application.

In the prior art, a portal system is just such a traditional web application. Whenever a user submits a form on a portlet, the portal server will respond by sending a new portal page. In fact, however, it is needless to send web contents of other portlets in the portal page. And it is enough to reload only the web contents of the portlet with which the user is interacting.

An emerging technology, called as AJAX (Asynchronous and JavaScript XML), for asynchronous web is developed for refreshing part of a page instead of refreshing the whole page on every interaction between the user and application. In an AJAX application, when a user submits a form in a page, instead of the web browser directly sending a HTTP (Hypertext Transfer Protocol) request to the web server, a script program, usually a JavaScript program, resident on the web browser receives the user's request and sends a XMLHTTP (Extended Markup Language HTTP) request to the web server in background through an API (Application Program Interface), so as to retrieve only the needed web contents instead of the whole page and perform corresponding processing to partly refresh the page when receiving a response from the web server. In this way, the application response is speeded up, because the amount of data exchanged between the web browser and the web server is greatly reduced. And the processing time of the web server is saved because much of the processing is performed at client side.

At present, portlet developers can use AJAX to develop portlets so as to provide an asynchronous portal program. But now the most popular portlet programming models are all based on non-AJAX technology (e.g. JSR168), and almost all existing portlets have been developed in this way. Therefore, the solution of using AJAX to develop portlets would have the following shortcomings:

a) Using the new AJAX requires writing portlets in a completely new way, and rewriting millions of existing portlets is almost impossible.

b) Portlet developers have only to focus on portlet logic, and using AJAX will increase the complexity of the development because the developers have to take care of a lot of programming details.

Another solution for providing an asynchronous portal page is to use the "IFrame" (Inner Frame) tag in HTML, which can display a whole HTML page anywhere in another HTML page. The page in an IFrame can be loaded and operated separately. Thus, by combining portlets and the IFrame, asynchronous updating of portlets may be realized. However, this solution has the following defects:

a) The size of an IFrame is unchangeable. If its size is not big enough for the web contents, a scroll bar will be shown. This means dynamical adjustment of the portal page's layout is impossible when the web content of a portlet is changed.

b) All the web pages in an IFrame are separated, so that any common resource (e.g. CSS, images and others) cannot be shared. The same resource must be downloaded repeatedly.

In view of the forgoing, there apparently exists a need for a system and method for providing asynchronous portal pages. Specifically, there exists a need for a system and method for providing asynchronous portal pages in a portal system where the portlets are developed using traditional web technology (i.e. developed by using programming models based on synchronous refreshing technology).

SUMMARY OF THE INVENTION

In general, the present invention provides a system and method for providing asynchronous portal pages without changing traditional portlet programming models.

According to an aspect of the present invention, there is provided a method for providing asynchronous portal pages in a portal system, wherein the portlets in the portal system are developed using a programming model based on synchronous refreshing technology, the method comprising the steps of:

in response to a user's request for a portal page/portlet, a portlet monitor at client side sending a XMLHTTP request to a portal server;

in response to the XMLHTTP request, the portal server invoking a corresponding portlet to obtain the corresponding web contents;

modifying said web contents so that the HTTP requests therein are redirected to XMLHTTP requests; and the portlet monitor at client side refreshing the web contents of the corresponding portlet in said portal page with said modified web contents.

Preferably, the method further comprises a step of initialization in which in response to a user request for a portal page from a web browser at client side, the portal server downloads said portlet monitor to the client side.

Preferably, said step of initialization comprises the steps of:

the web browser sending a request for a portal page to the portal server;

the portal server returning a portal page with said portlet monitor to the web browser;

the portlet monitor at client side sending XMLHTTP requests to said portal server asynchronously to obtain web contents of the corresponding portlet;

modifying said web contents so that the HTTP requests therein are redirected to XMLHTTP requests; and the portlet monitor at client side loading portlets in the portal page respectively with said modified web contents and finally displaying the whole portal page.

Preferably, said step of initialization comprises the steps of:

the web browser sending a request for a portal page to the portal server;

the portal server invoking portlets to obtain web contents of all the portlets in said portal page;

modifying the web contents of all the portlets so that the HTTP requests therein are redirected to XMLHTTP requests and the web contents of all the portlets are organized into a portal page; and returning the portal page with said portlet monitor to the web browser.

Preferably, said portlet monitor is implemented with a script embedded in said web contents.

Preferably, said portlet monitor is implemented with a separate script file.

Preferably, said step of modifying is performed in said portal server.

Preferably said step of modifying is performed by the portlet monitor at client side.

Preferably, said step of modifying comprises HTML rewriting and script rewriting.

Preferably, said step of modifying comprises the steps of:

for any HTML link tags, if it points to an Action URL, replacing its "href" attribute with a special script function call;

for any HTML form tag, if its "action" attribute equals to an Action URL, replacing the "action" attribute with a special script function call;

for any script statement that sends a HTTP request using the "GET" method, replacing it with a special script function call; and for any script statement that sends a HTTP request using the "POST" method, replacing it with a special script function call.

According to another aspect of the present invention, there is provided a portal system, comprising:

a portal server, comprising: a portlet service module configured to obtain the corresponding web contents from a corresponding portlet based on a XMLHTTP request from client side and send the web contents to the client side as a response; and at least one portlet that has been developed using a programming model based on synchronous refreshing technology, configured to process a request from the portlet service module and provide the corresponding web contents to it;

a client, which comprises a portlet monitor resident on a web browser, and configured to send a XMLHTTP request to said portal server during an interaction between a user and a portlet and refresh the web contents of the corresponding portlet in said portal page with the web contents in the response from said portal server; and web content rewriting means configured to rewrite the web contents that are sent to the client side from the portal server and redirect the HTTP requests therein to XMLHTTP requests.

According to a further aspect of the present invention, there is provided a system for providing asynchronous portal pages, comprising:

a portlet service module at portal server side configured to obtain the corresponding web contents from a corresponding portlet based on a XMLHTTP request from client side and send the web contents to the client side as a response;

a portlet monitor resident on a web browser at client side configured to send a XMLHTTP request to the portal service module during an interaction between a user and a portlet and refresh the web contents of the corresponding portlet in said portal page with the web contents in a response from the portal service module; and a web content rewriting means configured to rewrite the web contents that are sent to the client side from the portal server and redirect the HTTP requests therein to XMLHTTP requests.

From above it can be seen that, in the present invention, there is provided a portlet monitor that is resident on a web browser and implemented with a script (such as JavaScript or VBScript). When a user interacts with a portlet, the portlet monitor sends a XMLHTTP request to the portal server. The portal server obtains the corresponding web contents from a corresponding portlet based on the request. Then, the web contents are modified and the HTTP requests therein are redirected to XMLHTTP requests and sent to the portlet monitor as a response. The portlet monitor uses the modified web contents to refresh the web contents of the corresponding portlet in the portal page without reloading the whole portal page. Besides, after the user submits a request for a portlet, during the time waiting for the contents of the portlet being refreshed, the user may continue to interact with other portlets. Thus, the present invention has the functions of partially refreshing and asynchronous communication. Furthermore, since the present invention redirects the HTTP requests in the web contents of portlets to XMLHTTP requests instead of modifying the portlets themselves, it is possible to use millions of existing portlets. In general, the present invention will bring the following advantages.

The present invention can provide portal pages with good response, which is obtained through partially refreshing and asynchronous communication. Such portal pages are called asynchronous portal pages.

All portlets in a portal page may share any common resources without repeatedly downloading since these portlets are in the same web page.

The present invention can integrate portlets based on traditional web technology into an asynchronous portal page. Portlet developers need not to rewrite them using AJAX.

As a pluggable module, the present invention can be implemented easily at an existing portal server. The module is transparent to portlet developers.

BRIEF DESCRIPTION OF THE DRAWINGS

A complete understanding of the present invention can be obtained through reading the following detailed description of embodiments of the present invention with reference to the drawings, wherein.

DESCRIPTION OF THE PREFERRED EMBODIMENTS

Figure 1:
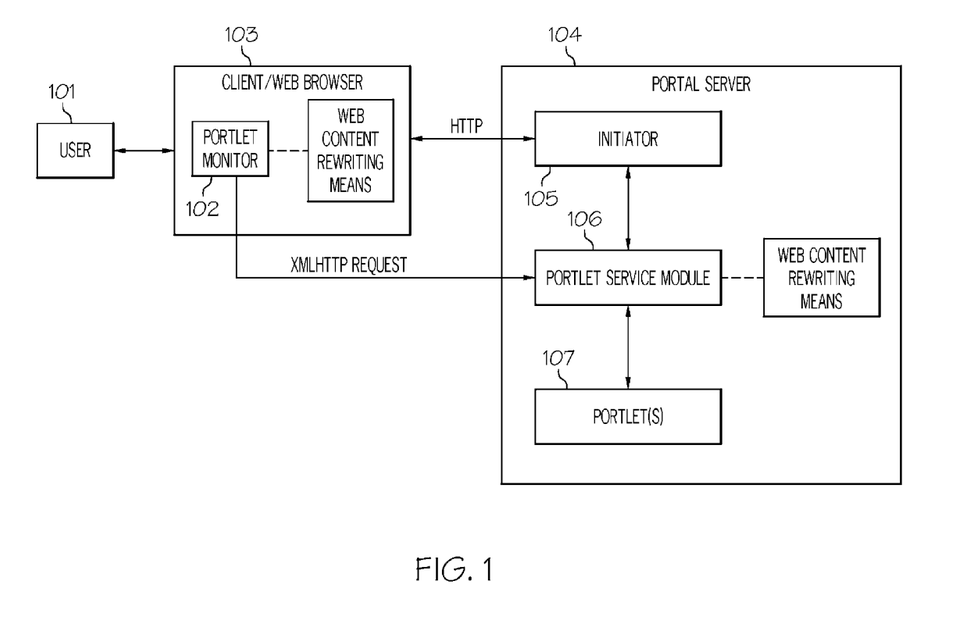
FIG. 1 is a block diagram showing a portal system according to a preferred embodiment of the present invention.
Figure 2:
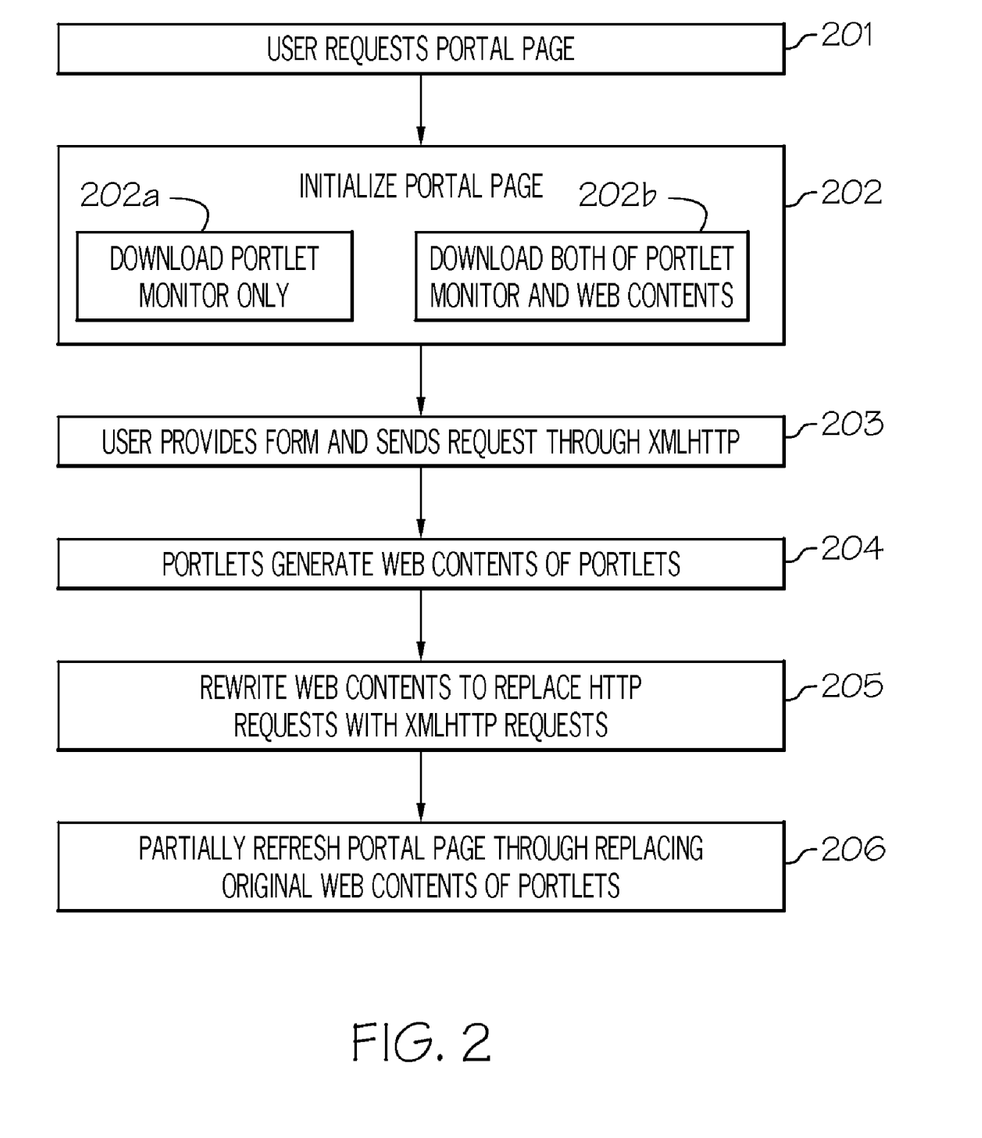
FIG. 2 is a flowchart showing a method for providing asynchronous portal pages according to a preferred embodiment of the present invention.

The present disclosure proposes a system for providing asynchronous portal pages. FIG. 1 and FIG. 2 show a block diagram of a portal system and a flowchart of a method for providing asynchronous portal pages, respectively, according to preferred embodiments of the present invention.

Now referring to FIG. 1, a portal system according to a preferred embodiment of the present invention is shown. As shown in the figure, the portal system comprises a portal server 104 and a client 103. The portal server 104 comprises three components, initiator 105, portlet service module 106 and one or more portlets 107. These portlets have been developed using programming models based on synchronous technology (such as JSR168). The client 103 comprises a portlet monitor 102 residents on a web browser. According to an embodiment of the present invention, the portal server 104 further comprises means for rewriting web contents (shown with dashed lines). According to another embodiment, the means for rewriting web contents is located at client side (shown with dashed lines).

The portlet monitor 102 may be implemented with a script (such as JavaScript or VBScript) that is resident in web contents and running on a web browser. It has at least two functions, that is, sending a XMLHTTP request to the portal server 104 and replacing the web content of a portlet that needs to be updated with the web content in a response from the portal server 104, without refreshing the whole portal page. The function of the portlet service module 106 is to obtain web contents from the portlets 107 based on a request from the portlet monitor 102 and send the web contents to the portlet monitor 102 as a response. The initiator 105 is used to download the portlet monitor 102 and a portlet configuration file etc. to the client side when a user initially requests a portal page, wherein the configuration file provides the information on portlet's ID, layout and style etc. The portlets 107 are used to process requests from the portlet service module 106 and provide web contents to it. The means for rewriting web contents is used to redirect the traditional HTTP requests in the web contents that are returned to the client side from the portal server 104 to XMLHTTP requests. It should be noted that the means may be implemented with a separate component in the portal server 104 or by the portlet service module 106, and also may be implemented with a separate component at client side or as part of the portlet monitor.

Now referring to FIG. 2, a flowchart of a method for providing asynchronous portal pages according to a preferred embodiment of the present invention is shown. The working flow may be divided into 6 phases 201 to 206.

In Phase 201, the user requests a portal page with a URL. Then, in phase 202, the web browser downloads the portal page. There are two portal initialization modes, which are, only downloading a portlet monitor (as shown in Phase 202a, here downloading a portlet monitor usually comprises two parts: downloading the portlet monitor and downloading a portlet configuration file) or downloading both the portlet monitor and the web contents of the portlets (as shown in Phase 202b). If only the portlet monitor is downloaded, the portlet monitor will obtain the web contents subsequently and asynchronously. Thus, the users experience can be improved during the initialization. With such a solution, however, more times of network I/O between the browser and the portal server may be required. If both the portlet monitor and the web contents of the portlets are downloaded, less times of network I/O are required. But the portal page is loaded synchronously. Both in Phases 202a and 202b, the web contents of the portlets will be rewritten to replace the original HTTP requests with XMLHTTP requests. Then, in Phase 203, the user will submit a request in the portal page and this request will be submitted by the portlet monitor to the portal server through XMLHTTP. In Phase 204, the portlet generates the web contents of the portlet based on the user's request received from the portlet service module, and will also rewrite the web contents in Phase 205. Finally in Phase 206, the portal page is partially refreshed by replacing the original web contents with new ones.

It should be noted that Phase 205 can happen either at client side or at portal server side. If it happens at client side, more cost at client side and less cost at server side is needed, and vice versa.

Besides, it should be further noted that in above embodiments it is in the phase of initialization that the portal server downloads the portlet monitor (including a portlet configuration file) to the client side based on the user's request for an initial portal page from the web browser. However, as an alternative, the portlet monitor may be embedded into an existing web browser, so that when the user requests an initial portal page, the portlet monitor can intercept the request and asynchronously load every portlet of the initial portal page through XMLHTTP requests.

Next, a detailed description will be given to the six phases shown in FIG. 2 according to the system shown in FIG. 1.

Portal Page Initialization Mechanism

As shown in FIG. 2, the portal page initialization steps comprise Phases 201 to 202. In the present invention there are two initialization modes. Next, these two modes will be described respectively.

1) Portal Page Initialization Mechanism (Downloading a Portlet Monitor Only)

Figure 3A:
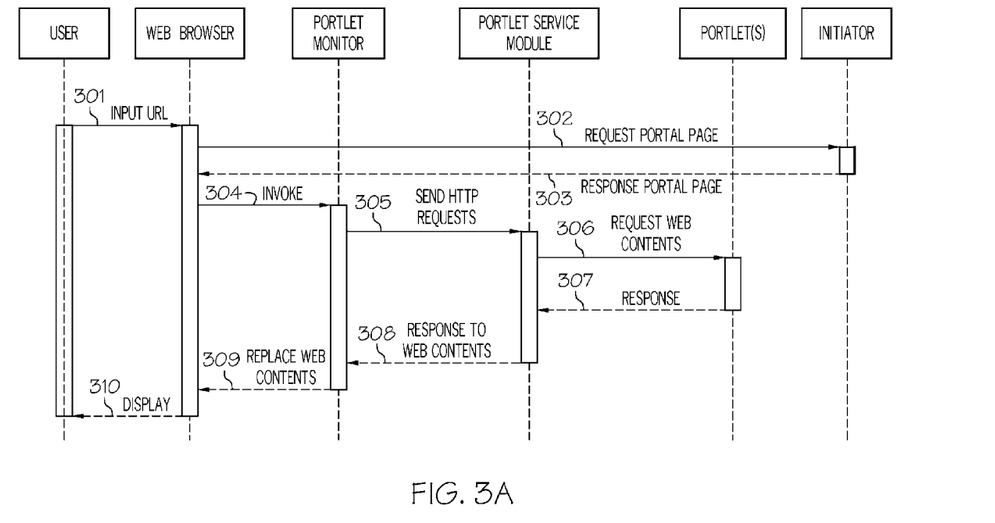
FIG. 3a is a sequence chart showing a portal page initialization mechanism according to a preferred embodiment of the present invention.

FIG. 3a is a sequence chart showing a portal page initialization mechanism (downloading a portlet monitor only) according to a preferred embodiment of the present invention.

Referring to FIG. 3a, in the mode of downloading a portlet monitor only, Phase 202a comprises Steps 302 to 310, which execute the function of downloading a portal page.

In Step 301, the user inputs a URL in a web browser to send a request to the portal server for obtaining a portal page.

In Step 302, the web browser sends the request for a portal page to the initiator on the portal server.

In Step 303, in a response, the initiator sends back a web page with a portlet monitor.

In Step 304, the web browser invokes the received portlet monitor to send XMLHTTP requests for obtaining the web contents of the portlets.

In Step 305, the portlet monitor asynchronously sends XMLHTTP requests to the portal server. In this step, the user can interact with the portal page without waiting.

in Step 306, the portlet service module requests the web contents from the portlets. The portlets may be a local portlet container or a remote service (e.g. a web service for remote portlets). So the step may be invoked locally or remotely.

In Step 307, the portlets return the web contents of the portlets.

In Step 308, the portlet service module sends back a response with the web contents of the portlets to the web browser. During this step, the web contents should be rewritten so as to redirect the requests therein to XMLHTTP. The rewriting operation can happen at the beginning or at the end of Step 308, that is, the rewriting operation can be implemented in the portal server or portlet monitor at client side.

In Step 309, the web contents of the portlets are replaced with the new ones.

In Step 310, the web browser displays the web contents. When the web contents of all the portlets are obtained, the whole portal page is displayed.

2) Portal Page Initialization Mechanism (Downloading Both a Portlet Monitor and Web Contents)

Figure 3B:
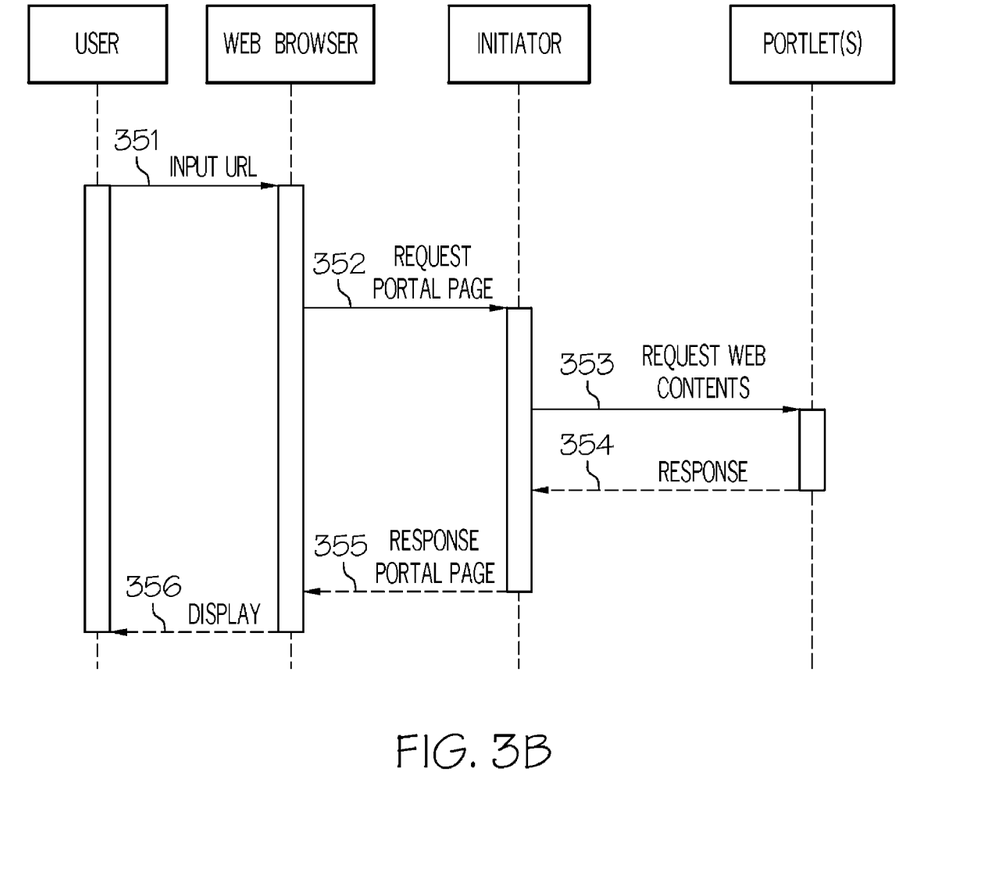
FIG. 3b is a sequence chart showing a portal page initialization mechanism according to another preferred embodiment of the present invention.

FIG. 3b is a sequence chart showing a portal page initialization mechanism (downloading both a portlet monitor and web contents) according to another preferred embodiment of the present invention.

Referring to FIG. 3b, in the mode of downloading both a portlet monitor and web contents, Phase 202b comprises Steps 351 to 356, which perform the function of downloading a portal page.

In Step 351, the user inputs a URL in a web browser to send a request to the portal server for obtaining a portal page.

In Step 352, the web browser sends the request for a portal page to the initiator.

In Step 353, the initiator invokes the portlets to obtaining the web contents of all the portlets in the portal page.

In Step 354, the portlets return the web contents of all the portlets. The initiator rewrites the web contents so as to redirect the requests therein to XMLHTTP and combines them into a portal page with a portlet monitor.

In Step 355, the initiator returns the portal page to the web browser.

In Step 356, the web browser displays the portal page.

Asynchronous Interaction Mechanism

Figure 4:
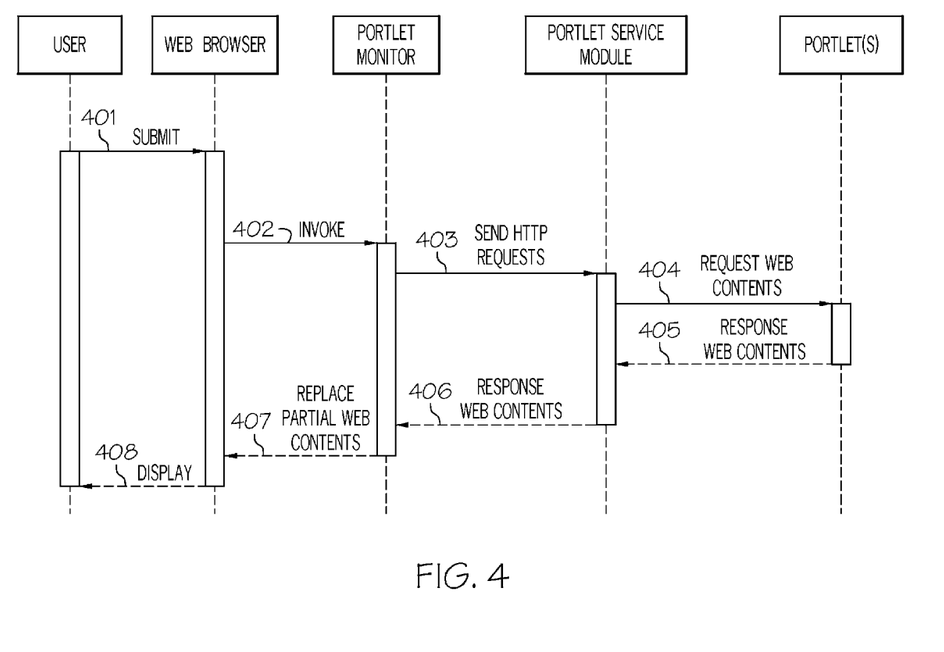
FIG. 4 is a sequence chart showing the asynchronous interaction mechanism according to a preferred embodiment of the present invention.

Referring to FIG. 2, the asynchronous interaction mechanism according to an embodiment of the present invention comprises four phases 203 to 206. FIG. 4 shows a sequence chart of the asynchronous interaction mechanism.

Referring to FIG. 4, Phase 203 comprises Steps 401 to 403 and performs the function of sending a XMLHTTP request to the portlet service module through the portlet monitor; Phase 204 comprises Steps 404 to 406 and performs the function of obtaining web contents from portlets. Phase 205 may happen at the beginning or at the end of Step 406. Phase 206 comprises Steps 407 and 408 and performs the function of replacing the original web contents of the portlets with the received new web contents and displaying them.

In Step 401, the user submits a form in a certain portlet.

In Step 402, the web browser invokes the portlet monitor so as to send a XMLHTTP request for obtaining the new web contents of the portlet.

In Step 403, the portlet monitor asynchronously sends a XMLHTTP request to the portal service. During this step, the user may interact with the portal page without waiting.

In Step 404, the portlet service module requests the web contents from the portlet.

In Step 405, the portlet returns the web contents of the portlet to the portlet service module.

In Step 406, the portlet service module sends a response with the web contents of the portlet to the portlet monitor. Phase 205 happens at the beginning or at the end of Step 406, that is, Phase 205 may be implemented in the portal server or in the portlet monitor at client side.

In Step 407, the portlet monitor replaces the original web contents of the portlet with the new web contents received.

In Step 408, the web browser displays a portal page with the new web contents of the portlet without refreshing the whole portal page.

Web Contents Rewriting Mechanism

Phase 205 performs the function of web content rewriting. If the original web contents of the portlets are used, any submission will cause the web browser sending a HTTP request, resulting in refreshing the whole page. So the web contents should be rewritten to redirect any submission to XMLHTTP, so as to partially refresh the portal page. In an embodiment of the present invention, the rewriting process comprises two steps, that is, HTML rewriting and script rewriting.

Next, these two steps will be described in detail based on principles and examples. In the following examples, function "xmlAction" will send a request through XMLHTTP and partially refresh the new portal page. In a typical implementation, the program of the portlet monitor should be stored in a separate script file in order to reuse it in different portal pages. For instance:

<script src="xmlaction.js"/></script>

When different portal programs depend on the script file, the web browser may cache the script file.

1) HTML Rewriting

For any HTML link tag, if it points to an Action URL, a special script function call is used to replace the "href" attribute.

For instance,

<a href="actionurl">link</a> will be replaced with

<a href="javascript:xmlAction('actionurl')">link</a> and

<a href="javascript:form.submit( )">link</a> will be replaced with

<a href="javascript.xmlAction(form)">link</a>

For any HTML form tag, if its "action" attribute equals to an Action URL, a special script function call is used to replace the "action" attribute.

For instance,

<form action="actionurl">

<input type="submit" value="submit"/>

</form> will be replaced with

<form action="actionurl" onsubmit="xmlAction('actionurl')">

<input type="submit" value="submit"/>

</form>

2) Script Rewriting

For any script statement that sends a HTTP request using the "GET" method, a special script function call is used to replace it.

For instance,
document.location.href="actionurl";
will be replaced with
xmlAction("actionurl");

For any script statement that sends an HTTP request using the "POST" method, a special script function call is used to replace it.

For instance,
form.submit( );
will be replaced with
xmlAction(form);

Above, embodiments of the present invention have been described, the description being illustrative and not restrictive. Various modifications may be made to the present invention without departing from the spirit and scope of the invention. For instance, the portlet monitor may be implemented in any script language that may runs on a browser. Furthermore, when the web content rewriting means is implemented in a portal server, it may either be integrated in the portlet service module or as a separate component, and may be connected with other components in various manners and orders. And when the web content rewriting means is implemented at the portlet monitor, it may either be a part of the portlet monitor or a separate component invoked by the portlet monitor. Besides, the functional modules in the embodiments of the present invention may either exist separately or be combined together in various manners, and may be implemented in hardware, software, firmware or any combination of them as long as being able to realize the functions of the present invention. Furthermore, the terms used in this specification are descriptive, and for the purpose of making those skilled in the art to understand the essence of the invention, not for imposing strict restrictions on the invention. The scope of the invention is uniquely defined by following claims.

The invention claimed is:

1. A method for providing portal pages in a portal system, the method comprising:
    a portal server downloading a portlet monitor into a client computer in response to an initial request for a portal page from a web browser on a client computer;
    the portal server receiving an XMLHTTP request from the portlet monitor, wherein the XMLHTTP request is for initial web contents that are identified by a portlet;
    in response to receiving the XMLHTTP request, the portal server invoking the portlet to obtain the initial web contents;
    modifying the initial web contents into modified web contents such that future HTTP requests from the client computer for the initial web contents are redirected to XMLHTTP requests, wherein the portlet monitor utilizes the modified web contents as updates to the initial web contents;
    transmitting the modified web contents from the portal server to the portlet monitor at the client computer;
    for any HTML link tag that points to an Action URL, replacing the Action URL's "href" attribute with a first special script function call;
    for any HTML form tag whose "action" attribute equals an Action URL, replacing the "action" attribute of the HTML form with a second special script function call;
    for any script statement that sends an HTTP request using the "GET" method, replacing the HTTP request with a third special script function call; and
    for any script statement that sends an HTTP request using the "POST" method, replacing the HTTP request with a fourth special script function call.

2. The method of claim 1, wherein said downloading said portlet monitor comprises:
    the portal server receiving a request from the web browser for the portal page;
    the portal server returning the portal page with said portlet monitor to the web browser;
    the portal server receiving the future HTTP requests from the portlet monitor, wherein said portal server asynchronously receives the future HTTP requests for obtaining the modified web contents of a corresponding portlet;
    the portal server modifying said initial web contents into modified web contents so that the future HTTP requests are redirected to the XMLHTTP requests; and
    the portal server transmitting the modified web contents to the portlet monitor to enable the portlet monitor to load the portlets in the portal page respectively with said modified web contents and to display the whole portal page.

3. The method according to claim 1, wherein said downloading said portlet monitor comprises:
    the portal server receiving, from the web browser, a request for the portal page;
    the portal server invoking portlets to obtain web contents of all portlets in said portal page;
    the portal server modifying the web contents of all portlets so that the future HTTP requests are redirected to the XMLHTTP requests and organizing the web contents of all the portlets into a portal page; and
    the portal server returning the portal page with said portlet monitor to the web browser.

4. The method of claim 1, wherein said portlet monitor is implemented with a script embedded in said modified web contents.

5. The method of claim 1, wherein said portlet monitor is implemented with a separate script file.

6. The method of claim 1, wherein said modifying is performed in said portal server.

7. The method of claim 1, wherein said modifying is performed by the portlet monitor at the client computer.

8. The method of claim 1, wherein said modifying comprises HTML rewriting and script rewriting.

9. A portal system, comprising:
    a portal server, wherein the portal server comprises a processor that executes software program instructions to implement:
        an initiator adapted to download a portlet monitor to a client computer in response to a user initially requesting a portal page;
        a portlet service module adapted to obtain corresponding web contents from a corresponding portlet based on an XMLHTTP request from the client computer, wherein the portlet service module is further adapted to send the corresponding web contents to the client computer as a response; and
        at least one portlet that has been developed using a programming model based on synchronous refreshing technology, wherein said at least one portlet is adapted to process a request from the portlet service module and provide the corresponding web contents to the client computer;
    wherein the client computer comprises a portlet monitor resident on a web browser, wherein the client computer is adapted to send an XMLHTTP request to said portal server during an interaction between a user and a portlet, and wherein the client computer is adapted to refresh the corresponding web contents of the corresponding portlet in said portal page with the corresponding web contents in the response from said portal server; and
    web content rewriting logic adapted to rewrite the corresponding web contents that are sent to the client computer and to redirect the HTTP requests therein to XMLHTTP requests; and wherein:
        for any HTML link tag that points to an Action URL, replacing the Action URL's "href" attribute with a first special script function call;
        for any HTML form tag whose "action" attribute equals to Action URL, replacing the "action" attribute of the HTML form with a second special script function call;
        for any script statement that sends an HTTP request using the "GET" method, replacing the HTTP request with a third special script function call; and for any script statement that sends an HTTP request using the "POST" method, replacing the HTTP request with a fourth special script function call.

10. The system of claim 9, wherein said portlet monitor is implemented with a script resident in the corresponding web contents.

11. The system of claim 9, wherein said portlet monitor is implemented with a separate script file.

12. The system of claim 9, wherein said web content rewriting logic is located in said portal server.

13. The system of claim 9, wherein said web content rewriting logic is located at the client computer.

14. The system of claim 9, wherein said web content rewriting logic comprises HTML rewriting logic and script rewriting logic.

15. A computer program product for providing portal pages in a portal system, the computer program product comprising:
a non-transitory computer readable storage media;
first program instructions to download a portlet monitor into a client computer in response to an initial request for a portal page from a web browser on a client computer;
second program instructions to receive an XMLHTTP request from the portlet monitor, wherein the XMLHTTP request is for initial web contents that are identified by a portlet;
third program instructions, to, in response to receiving the XMLHTTP request, invoke the portlet to obtain the initial web contents;
fourth program instructions to modify the initial web contents into modified web contents such that future HTTP requests from the client computer for the initial web contents are redirected to XMLHTTP requests, wherein the portlet monitor utilizes the modified web contents as updates to the initial web contents;
fifth program instructions to transmit the modified web contents from the portal server to the portlet monitor at the client computer;
sixth program instructions to, for any HTML link tag that points to an Action URL, replace the Action URL's "href" attribute with a first special script function call;
seventh program instructions to, for any HTML form tag whose "action" attribute equals an Action URL, replace the "action" attribute of the HTML form with a second special script function call;
eighth program instructions to, for any script statement that sends an HTTP request using the "GET" method, replace the HTTP request with a third special script function call; and
ninth program instructions to, for any script statement that sends an HTTP request using the "POST" method, replace the HTTP request with a fourth special script function call; and wherein
the first, second, third, fourth, fifth, sixth, seventh, eighth, and ninth program instructions are stored on the non-transitory computer readable storage media.

* * * * *